United States Patent
Khoury et al.

(10) Patent No.: US 11,190,295 B2
(45) Date of Patent: Nov. 30, 2021

(54) REMEDIAL ACTION BASED ON INTER-PACKET RECEIVE POWER

(71) Applicant: ARRIS Enterprises LLC, Suwanee, GA (US)

(72) Inventors: Peter Khoury, San Francisco, CA (US); Victor Shtrom, Los Altos, CA (US); William S. Kish, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/535,758

(22) Filed: Aug. 8, 2019

(65) Prior Publication Data

US 2019/0363822 A1 Nov. 28, 2019

Related U.S. Application Data

(63) Continuation of application No. 14/870,496, filed on Sep. 30, 2015, now Pat. No. 10,419,155.

(Continued)

(51) Int. Cl.
*H04L 1/00* (2006.01)
*H04B 17/10* (2015.01)
(Continued)

(52) U.S. Cl.
CPC ......... *H04L 1/0003* (2013.01); *H04B 17/102* (2015.01); *H04B 17/318* (2015.01);
(Continued)

(58) Field of Classification Search
CPC . H04W 72/085; H04W 72/082; H04W 4/023; H04W 52/243; H04W 52/241;
(Continued)

(56) References Cited

U.S. PATENT DOCUMENTS

| 7,466,682 B1 * | 12/2008 | Ribas ................. H04W 52/343 370/317 |
| 8,937,968 B1 | 1/2015 | Venkatesh |

(Continued)

FOREIGN PATENT DOCUMENTS

EP 2736285 A1 5/2014

OTHER PUBLICATIONS

Translation of First Office Action corresponding to Chinese Patent Application No. 201580053270.1 (12 pages) (dated Feb. 6, 2020).

(Continued)

*Primary Examiner* — Elton Williams
(74) *Attorney, Agent, or Firm* — Steven Stupp; Stewart Wiener

(57) ABSTRACT

In order to maintain performance during wireless communication, a transmitting electronic device may selectively perform a remedial action based on a received power in a channel during time intervals between received packets (e.g., due to interference) and/or a metric associated with the measured received power. In particular, when the received power is less than a threshold value (e.g., when the interference is insufficient to stop transmission by the transmitting electronic device), the transmitting electronic device performs the remedial action based on the measured received power and/or the metric. For example, the remedial action may include: selecting a modulation technique; selecting the receiving electronic device; selecting an antenna pattern for the one or more antennas; reducing a transmit power; selecting a data rate; determining a cumulative distribution function; and/or estimating a channel capacity. Next, the transmitting electronic device transmits a packet in the channel to a receiving electronic device.

20 Claims, 6 Drawing Sheets

Related U.S. Application Data

(60) Provisional application No. 62/057,944, filed on Sep. 30, 2014.

(51) Int. Cl.
*H04B 17/318* (2015.01)
*H04B 7/06* (2006.01)
*H04W 52/42* (2009.01)

(52) U.S. Cl.
CPC ........... *H04B 7/0617* (2013.01); *H04W 52/42* (2013.01); *Y02D 30/50* (2020.08)

(58) Field of Classification Search
CPC .. H04W 52/244; H04B 17/318; H04B 17/345
See application file for complete search history.

(56) References Cited

U.S. PATENT DOCUMENTS

| | | | |
|---|---|---|---|
| 2002/0012382 A1 | 1/2002 | Schilling | |
| 2003/0179756 A1* | 9/2003 | Cain | H04W 72/085 370/395.42 |
| 2006/0109931 A1* | 5/2006 | Asai | H04B 1/0003 375/299 |
| 2006/0171326 A1 | 8/2006 | Durand et al. | |
| 2011/0134844 A1 | 6/2011 | Hosono | |
| 2012/0034925 A1 | 2/2012 | Noh et al. | |
| 2012/0058796 A1 | 3/2012 | Miyabayashi et al. | |
| 2012/0142364 A1* | 6/2012 | Duan | H04W 52/244 455/450 |
| 2012/0178386 A1* | 7/2012 | Pascolini | H04B 1/525 455/84 |
| 2013/0208587 A1* | 8/2013 | Bala | H04W 16/14 370/230 |
| 2014/0099941 A1* | 4/2014 | Ji | H04W 48/16 455/423 |
| 2016/0037525 A1* | 2/2016 | Malmirchegini | H04W 24/02 370/329 |

OTHER PUBLICATIONS

Translation of Second Office Action corresponding to Chinese Patent Application No. 201580053270.1 (14 pages) (dated Oct. 13, 2020).

* cited by examiner

REMEDIAL ACTION BASED ON INTER-PACKET RECEIVE POWER

CROSS-REFERENCE TO RELATED APPLICATION

This application is a continuation under 35 U.S.C. § 120 of U.S. Non-Provisional application Ser. No. 14/870,496, entitled "Remedial Action Based on Inter-Packet Received Power," by Peter Khoury, Victor Shtrom, William S. Kish, filed on Sep. 30, 2015, which claims priority under 35 U.S.C. § 119(e) to U.S. Provisional Application Ser. No. 62/057,944, entitled "Remedial Action Based on Inter-Packet Received Power," by Peter Khoury, Victor Shtrom, William S. Kish, filed on Sep. 30, 2014, the contents of both of which are herein incorporated by reference.

BACKGROUND

Field

The described embodiments relate to techniques for selectively performing a remedial action to maintain communication performance in a wireless network. In particular, the described embodiments relate to techniques for selectively performing the remedial action in the wireless network based on an inter-packet received power.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth® from the Bluetooth Special Interest Group of Kirkland, Wash.), and/or another type of wireless network.

However, the performance of wireless communications among electronic devices can vary significantly over time. For example, interference can significantly degrade the performance of wireless communication. In particular, when there is a so-called 'hidden node' in a wireless-local-area network (WLAN), it is possible for two transmitting electronic devices (which are too far apart to directly communicate with each other) to simultaneously transmit packets to one or more receiving electronic devices in the WLAN. In this case, the interference associated with the transmissions from a first transmitting electronic device at the second transmitting electronic device may not be high enough to stop the second electronic device from transmitting. Instead, the interference may significantly degrade the communication performance (e.g., the packet error rate may be increased), which can result in more retries and increased latency during communication.

A similar situation may occur when two proximate transmitting electronic devices are using different but overlapping channels. In this case, a first transmitting electronic device may begin transmitting, and because the transmission is off channel it may not be detected by a second transmitting electronic device, or it may not be at a high-enough level to prevent the second transmitting electronic device from transmitting. However, the transmissions may be strong enough to impair the transmission of a packet from the second transmitting electronic device to a client device. Once again, the resulting degradation in performance may result in more retries and increased latency during communication, which may degrade the user's experience.

SUMMARY

The described embodiments relate to a transmitting electronic device that performs a remedial action to maintain communication performance. This transmitting electronic device includes: one or more antennas: and an interface circuit, coupled to the one or more antennas, which communicates with at least a receiving electronic device. During operation, the transmitting electronic device measures received power in a channel during time intervals between received packets. Then, the transmitting electronic device compares the measured received power to a threshold value. When the measured received power is less than the threshold value, the transmitting electronic device performs the remedial action based on: the measured received power, and/or a metric associated with the measured received power. Next, the transmitting electronic device transmits a packet in the channel to the receiving electronic device in a manner consistent with the remedial action.

Note that the remedial action may include selecting a modulation technique for the packet. Moreover, the modulation technique may be based on a channel correlation interval.

Furthermore, the remedial action may include selecting the receiving electronic device (from a set of two or more receiving electronic devices) at a distance less than a threshold distance value from the transmitting electronic device.

Additionally, the remedial action may include selecting an antenna pattern for the one or more antennas, where the antenna pattern is used in: transmitting information to the receiving electronic device; and/or receiving information from the receiving electronic device.

In some embodiments, the remedial action includes: reducing a transmit power used when transmitting the packet and/or selecting a data rate for use when transmitting the packet.

Moreover, the remedial action may include determining a cumulative distribution function based on the measured received power, and estimating a channel capacity based on the determined cumulative distribution function. In addition, the remedial action further may include setting a clear channel assessment based on the determined cumulative distribution function.

Note that the measured received power may be aggregated across the channel. Alternatively or additionally, the measured received power may be determined per subcarrier in the channel. In some embodiments, the remedial action is performed on a per-measurement basis for the measured received power.

Furthermore, the transmitting electronic device may determine the cumulative distribution function based on the measured received power, where the metric may correspond to a noise floor in the cumulative distribution function.

In some embodiments, the transmitting electronic device includes: a processor; and a memory, coupled to the processor, which stores a program module that is executed by the processor. This program module may include instructions for at least some of the operations performed by the transmitting electronic device (i.e., at least some of the operations performed by the transmitting electronic device may be performed using software).

Another embodiment provides a computer-program product for use with the transmitting electronic device. This computer-program product includes instructions for at least some of the operations performed by the transmitting electronic device.

Another embodiment provides a method for performing the remedial action. This method includes at least some of the operations performed by the transmitting electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to maintain performance during wireless communication, a transmitting electronic device may selectively perform a remedial action based on a received power in a channel during time intervals between received packets (e.g., due to interference) and/or a metric associated with the measured received power. In particular, when the received power is less than a threshold value (e.g., when the interference is insufficient to stop transmission by the transmitting electronic device), the transmitting electronic device performs the remedial action based on the measured received power and/or the metric. For example, the remedial action may include: selecting a modulation technique; selecting the receiving electronic device; selecting an antenna pattern for the one or more antennas; reducing a transmit power, selecting a data rate: determining a cumulative distribution function; and/or estimating a channel capacity. Next, the transmitting electronic device transmits a packet in the channel to a receiving electronic device. In these ways, the transmitting electronic device may maintain performance during the wireless communication.

In the discussion that follows, the electronic devices (such as the transmitting electronic device and the receiving electronic device) include radios that communicate packets in accordance with a communication protocol, such as an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), and/or another type of wireless interface (such as another wireless-local-area-network interface). In the discussion that follows, Wi-Fi is used as an illustrative example. However, a wide variety of communication protocols may be used.

Figure 1:
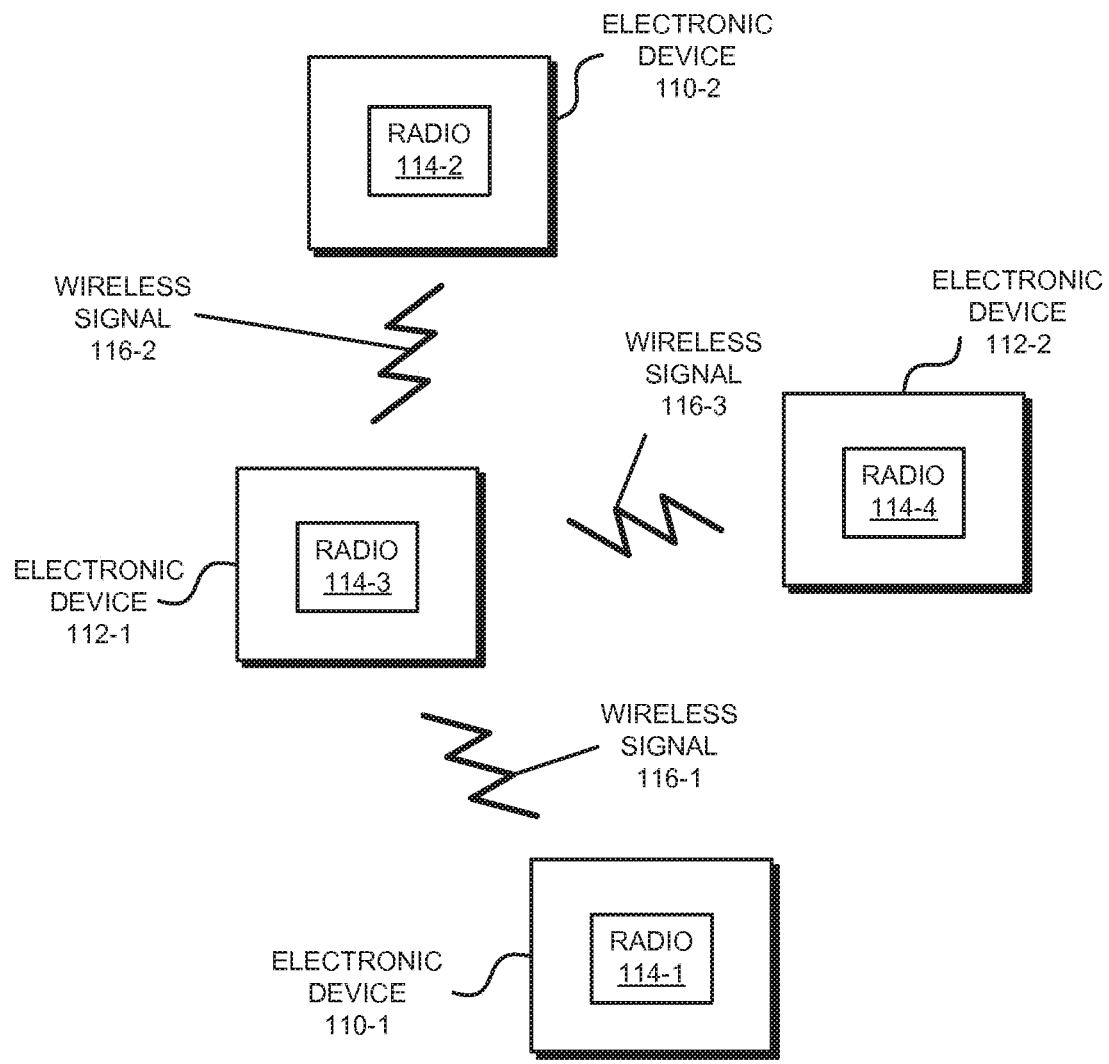
FIG. 1 is a block diagram illustrating electronic devices wirelessly communicating in accordance with an embodiment of the present disclosure.

Communication among electronic devices is shown in FIG. 1, which presents a block diagram illustrating electronic devices 110 (such as access points) wirelessly communicating with electronic devices 112 (such as portable electronic devices, e.g., cellular telephones). In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 6:
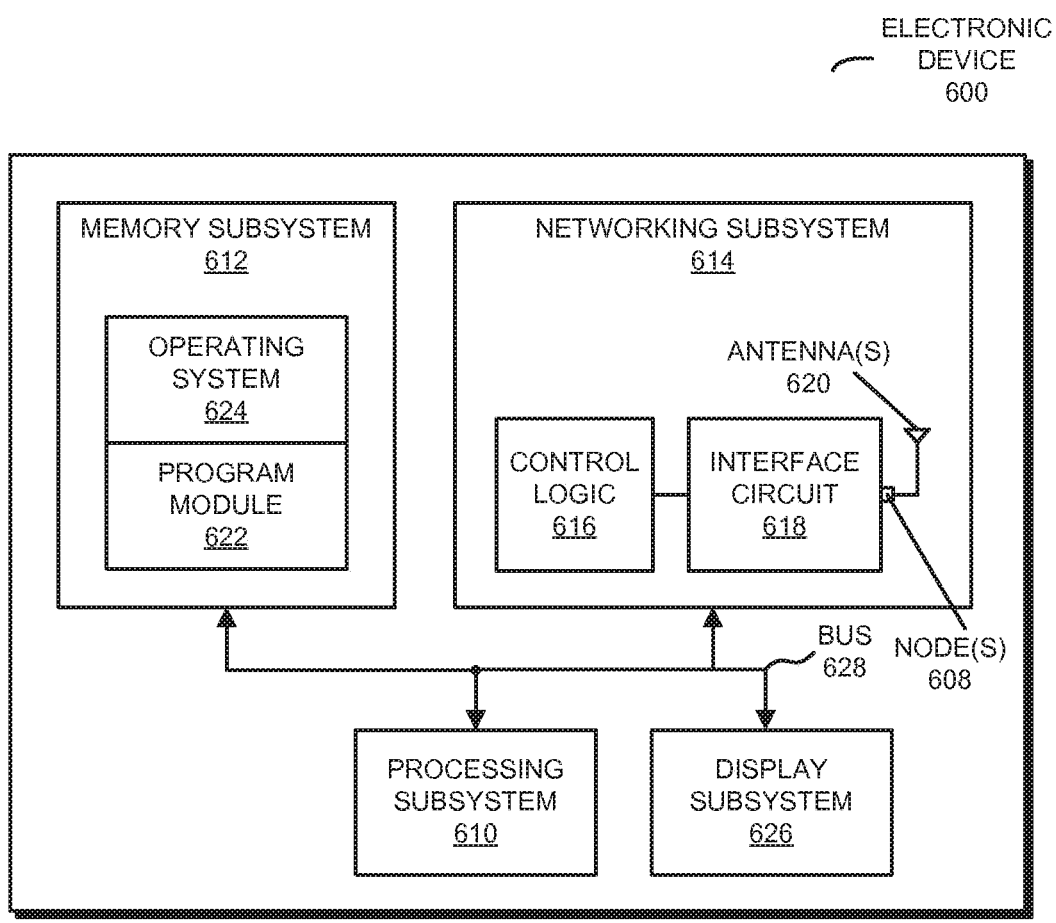
FIG. 6 is a block diagram illustrating one of the electronic devices of FIG. 1 in accordance with an embodiment of the present disclosure.

As described further below with reference to FIG. 6, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with each other. This wireless communication can comprise transmitting advertisements on wireless channels to enable electronic devices 110 and 112 to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 116 (represented by jagged lines) are transmitted by radios 114 in electronic devices 110. For example, radio 114-1 in electronic device 110-1 may transmit information (such as packets) using wireless signals. These wireless signals are received by radios 114 in one or more other electronic devices (such as electronic device 112-1). This may allow electronic device 110-1 to communicate information to electronic device 112-1.

In the described embodiments, processing a packet or frame in electronic devices 110 and 112 includes: receiving the wireless signals with the packet or frame; decoding/extracting the packet or frame from the received wireless signals to acquire the packet or frame; and processing the packet or frame to determine information contained in the packet or frame (such as feedback about the performance during the communication).

Note that the communication among electronic devices 110 and 112 (such as between at least any two of electronic devices 110 and 112) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication among electronic devices 110 and 112 (such as between at least any two of electronic devices 110 and 112) is characterized by an error-rate model, which compares the error rate during communication at the data rate.

However, as noted previously, the performance (as measured by one or more performance metrics) during the communication among electronic devices 110 and 112 may vary with time. In particular, interference associated with transmissions by electronic devices 110 and 112 may degrade the performance. This interference may be especially problematic in crowded or dense environments, in which the transmissions from neighboring or proximate electronic devices are received at one of electronic devices 110 and 112 (such as electronic device 110-1). Because, in general, the transmissions from electronic devices 110 and 112 are not synchronized, interference signals may arrive at electronic device 110-1 are at random times, including between the times when packets are received during intentional communication with another one of electronic devices 110 and 112. These interference signals can be characterized by a received power between the times when the packets are received (which is sometimes referred to as an 'inter-packet received power'). For example, a received signal strength indication (RSSI) between the times when the packets are received may correspond to the inter-packet received power.

If the inter-packet received power is too large (such as greater than −62 dBm), electronic device 110-1 may not be allowed to transmit packets on the channel. However, if the inter-packet received power is less than such a threshold value, the interference may still degrade the performance during communication, which may increase the latency of the communication and may degrade the experience of users of electronic device 110-1.

As described further below with reference to FIG. 2, in order to address this problem electronic device 110-1 may selectively perform a remedial action based on the inter-packet received power and/or a metric associated with the inter-packet received power (such as a parameter that corresponds to a noise floor, e.g., in a cumulative distribution function of the inter-packet received power). This may improve the performance of subsequent communication (such as transmitting a packet) even in the presence of the interference associated with the transmissions by one or more of electronic devices 110 and 112.

Note that a wide variety of operations may be performed during the remedial action. For example, the remedial action may include selecting a modulation technique for the packet (such as the modulation and coding scheme or MCS). In particular, when the inter-packet received power is larger (but still less than the threshold value, such as when the inter-packet received power is between −62 and −70 or −80 dBm), the coding rate may be increased, so that the communication is more robust (e.g., to maximize the data rate while minimizing the probability of a packet error). However, because the modulation technique impacts a packet length and the channel time associated with a packet, the modulation technique may be based on (or constrained by) a channel correlation interval (which may be determined using an autocorrelation of received wireless signals corresponding to at least a portion of packets, such as the preamble).

Alternatively or additionally, when the inter-packet received power is larger (but still less than the threshold value), the remedial action may include selectively or preferentially communicating with an electronic device (such as electronic device 112-1) that is closer to or proximate to electronic device 110-1 (relative to the distances to other electronic devices). For example, the distance between electronic devices 110-1 and 112-1 may be less than a threshold distance value (such as 100 m), thereby correcting or compensating for the impact of the inter-packet received power on the performance by reducing the distance loss during the communication. Note that this selective transmission control may be subject to a fairness constraint to prevent electronic device 112-1 from dominating the communication. Similarly, the remedial action may include reducing the data rate used during the communication when the inter-packet received power is larger (but still less than the threshold value), thereby correcting or compensating for the impact of the inter-packet received power on the performance.

In some embodiments, the remedial action may include selecting an antenna pattern for one or more antennas in electronic device 110-1, where the antenna pattern is used in: transmitting information (such as the packet) to an electronic device (such as electronic device 112-1); and/or receiving information from an electronic device (such as electronic device 112-1). For example, the antenna pattern may be selected so that the inter-packet received power is reduced or minimized (which may indicate that the antenna pattern does not receive the interference signal from an interference source, such as electronic device 110-2, as well as other antenna patterns). In some embodiments, electronic device 110-1 may scan through several antenna patterns and may select the antenna pattern with the lowest inter-packet received power or with an inter-packet received power that is less than a minimum value (such as −90 dBm). Then, the antenna pattern may be used by electronic device 110-1 when transmitting the packet, because this antenna pattern is also less likely to result in an interference signal at electronic device 110-1 or 110-2 (i.e., the antennas are preferentially transmitting in directions that have low interference energy). Similarly, the remedial action may include reducing a transmit power used when transmitting the packet, so that the interference signal at an electronic device (such as electronic device 110-2) is reduced.

As described further below with reference to FIG. 4, in some embodiments the remedial action includes determining the cumulative distribution function (which is sometimes referred to as an 'observed distribution') based on the inter-packet received power. For example, electronic device 110-1 may determine an observed distribution of the inter-packet received power (such as the inter-packet received power as a function of percentage or percentile of the time, e.g., 5% of the inter-packet time, etc.). In particular, the observed distribution may be sorted (such as percentile ranks of the observed distribution), e.g., into a histogram. However, the observed distribution may be other than a histogram. Note that, in general, an 'observed distribution' may include a collection of observed value samples from a random process (e.g., the measured inter-packet received power) that may be sorted from best to worst (or vice versa). Furthermore, the observed value samples may be decimated (e.g., every other value or, more generally, 1/N values may be removed from the sorted list, where N is an integer) to bound the size of the observed distribution without sacrificing statistical information.

In these embodiments, the metric associated with the inter-packet received power may correspond to the noise floor in the cumulative distribution function. For example, the noise floor may correspond to a tail of the observed distribution or may be associated with a percentile, such as the $10^{th}$ percentile, in the observed distribution. Note that the noise floor in the cumulative distribution function may impact a clear channel assessment (CCA), e.g., because the CCA may be defined relative to the noise floor (such as 30 dB above the noise floor). As described further below with reference to FIG. 3, the CCA may impact when electronic device 110-1 is allowed to transmit the packet. In particular, the CCA may impact the threshold value used to gate transmission by electronic device 110-1 (e.g., by forcing a backoff).

Alternatively or additionally, as described further below with reference to FIG. 4, the remedial action may include using the cumulative distribution function to estimate a channel capacity. For example, the channel capacity may be estimated based on the inter-packet received power at a particular percentile in the observed distribution (such as the $50^{th}$ percentile). This inter-packet received power may be mapped to a channel capacity (e.g., based on measurements or observations). Alternatively, the percentile in the observed distribution for a particular inter-packet received power may be used in a relative sense to estimate the channel capacity. In particular, the degree to which the current settings of parameters associated with one or more channels may be suboptimal may be assessed based on deviations in the percentile for the particular inter-packet received power from a target percentile. In some embodiments, the channel capacity is estimated based on the portion of the observed distribution for low and high values of the MCS. Note that electronic device 110-1 may determine the observed distribution rapidly because it can be determined without having to wait for transmissions.

Then, electronic device 110-1 may adapt the parameters associated with one or more channels based on the estimated channel capacity to increase or maximize the channel capacity. For example, the parameters may improve an orthogonality of the signals communicated using the one or more channels to reduce interference. Thus, the communication technique may leverage statistical knowledge of the background radio-frequency environment to obtain more accurate and better estimates of the channel capacity. This may allow more rapid and stable adaptation of the parameters.

Note that electronic device 110-1 may aggregate the measured inter-packet received power across the channel. (Thus, in some embodiments the inter-packet received power is an average value across the channel and/or as a function of time.) Alternatively or additionally, the measured inter-packet received power may be determined per subcarrier in the channel. Note that the inter-packet received power may be measured on an ongoing basis. Furthermore, in some embodiments the remedial action is performed on a per-measurement basis for the measured inter-packet received power. For example, transmission decisions may be made per station and/or per inter-packet receive power level (such as based on 3-6 dB bins). Thus, the remedial action may be performed dynamically to increase the performance during the communication even in the presence of time-varying interference.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
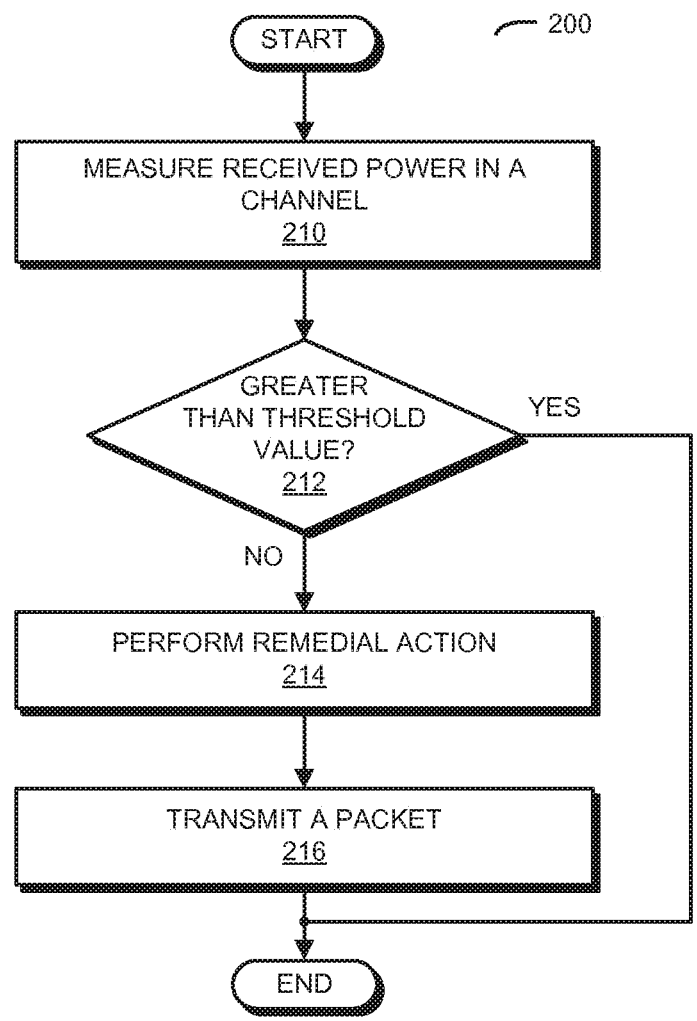
FIG. 2 is a flow diagram illustrating a method for performing a remedial action during communication among the electronic devices in FIG. 1 in accordance with an embodiment of the present disclosure.

FIG. 2 presents embodiments of a flow diagram illustrating method 200 for performing a remedial action that may be performed by an electronic device, such as one of electronic devices 110 in FIG. 1 (e.g., electronic device 110-1), according to some embodiments. During operation, the electronic device measures received power in a channel (operation 210) during time intervals between received packets (e.g., the inter-packet received power). Then, the electronic device compares the measured received power to a threshold value. For example, the electronic device may determine if the measured received power is greater than the threshold value (operation 212). If the measured received power exceeds the threshold value (operation 212), method 200 ends. Otherwise (operation 212), the electronic device performs the remedial action (operation 214) based on the measured received power and/or a metric associated with the measured received power. Next, the electronic device transmits a packet (operation 216) in the channel to a receiving electronic device in a manner consistent with the remedial action.

In this way, the electronic device (for example, an interface circuit, a driver and/or software executed in an environment of the transmitting electronic device) may facilitate communication with one or more other electronic devices in the presence of interference. In particular, the electronic device may improve or optimize the performance for interference that is less than the threshold value. This may reduce latency and, thus, may improve the user experience when communicating using the electronic device in a wireless network.

In some embodiments of method 200 (FIG. 2), there may be additional or fewer operations. Moreover, the order of the operations may be changed, and/or two or more operations may be combined into a single operation.

Figure 3:
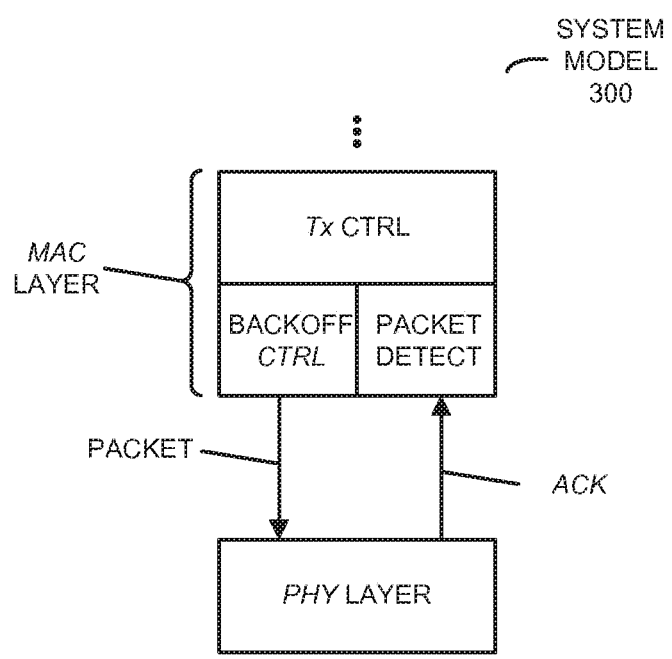
FIG. 3 is a drawing illustrating a system model in one of the electronic devices in FIG. 1 in accordance with an embodiment of the present disclosure.

As noted previously, in some embodiments the remedial action may be based on monitoring or measuring of the inter-packet received power in the wireless network. In particular, as shown in FIG. 3, which presents drawing illustrating a system model 300 in one of electronic devices 110 in FIG. 1 (such as electronic device 110-1), the remedial action may be performed in the context of a CCA-based backoff technique. In particular, transmission control (Tx ctrl) in a media access control (MAC) layer may construct a packet with a MAC address and MCS length. In addition, backoff control (backoff ctrl) may determine when the packet is transmitted by a physical (PHY) layer. For example, based on the CCA level, the backoff control may specify a backoff. Furthermore, the physical layer may determine the transmit power of the packet, as well as parameters such as the preamble autocorrelation. Subsequently, the physical layer may provide a received acknowledgment (ACK) to the MAC layer, where packet detection determines whether or not there was a packet error.

Figure 4:
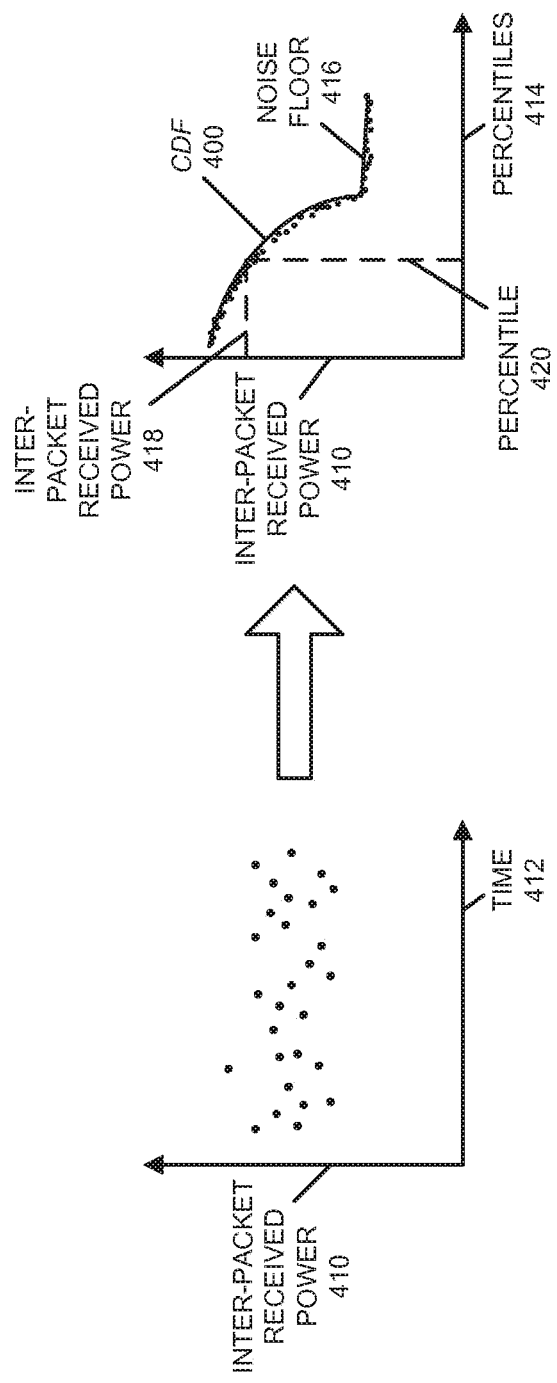
FIG. 4 is a drawing illustrating a cumulative distribution function of the received power during communication among the electronic devices in FIG. 1 in accordance with an embodiment of the present disclosure.

In some embodiments, as shown in FIG. 4, the electronic device (such as electronic device 110-1) determines cumulative distribution function (cdf) 400 of inter-packet received power 410 as a function of percentiles 414 based on measurements of inter-packet received power 410 as a function of time 412. This cumulative distribution function may define or specify noise floor 416. In addition, cumulative distribution function 400 may be used to estimate the channel capacity. For example, the channel capacity may be determined from inter-packet received power 418 at a particular percentile 420. Alternatively, the channel capacity may be determined from the difference in the percentile from a target percentile for a particular inter-packet received power. In some embodiments, the channel capacity is estimated based on the portion of the observed distribution for low and high values of the MCS.

Figure 5:
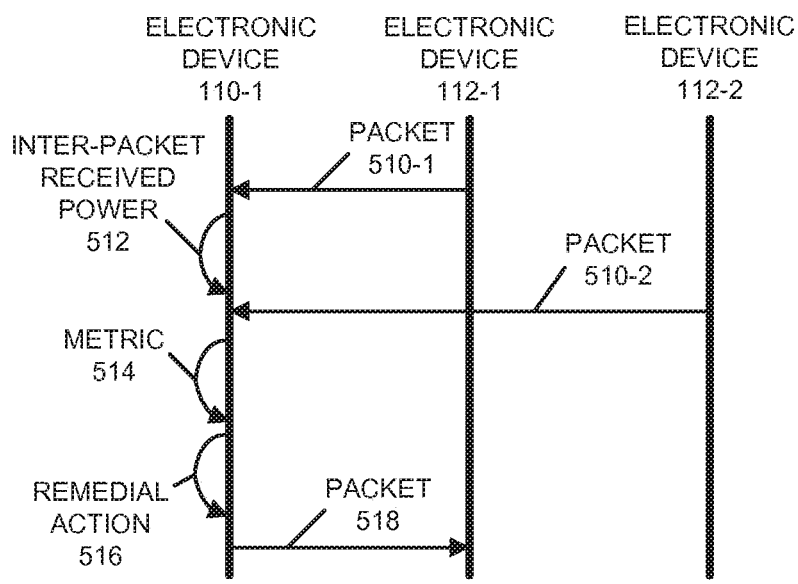
FIG. 5 is a drawing illustrating communication among the electronic devices in FIG. 1 in accordance with an embodiment of the present disclosure.

Embodiments of the communication technique are further illustrated in FIG. 5, which presents a drawing illustrating communication among electronic device 110-1 and electronic devices 112-1 and 112-2 (FIG. 1) according to some embodiments. In particular, during the communication technique electronic device 110-1 may measure inter-packet received power 512 between received packets 510 from electronic devices 112-1 and 112-2. Then, electronic device 110-1 may optionally determine a metric 514 associated with inter-packet received power 512. Next, electronic device 110-1 may perform remedial action 516 based on inter-packet received power 512 and/or metric 514. Furthermore, electronic device 110-1 may subsequently transmit a packet 518 (e.g., to electronic device 112-1) based on or in a manner consistent with remedial action 516.

We now describe embodiments of the electronic device. FIG. 6 presents a block diagram illustrating an electronic device 600, such as one of electronic devices 110 in FIG. 1 (e.g., electronic device 110-1). This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620. (While FIG. 6 includes one or more antennas 620, in some embodiments electronic device 600 includes one or more nodes 608. e.g., a pad, which can be coupled to one or more antennas 620. Thus, electronic device 600 may or may not include one or more antennas 620.) For example, networking subsystem 614 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems 610, memory subsystems 612, networking subsystems 614, and/or display subsystems 626. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, determining the cumulative distribution function, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) and/or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting electronic device, comprising:
an interface circuit configured to wirelessly communicate with at least a receiving electronic device, and wherein the transmitting electronic device is configured to:
measure, at an input node of the interface circuit of the transmitting electronic device, received power associated with a channel during time intervals between received packets;
compare the measured received power to a threshold value and a second threshold value, wherein the threshold value is always greater than the second threshold value;
when the measured received power is between the second threshold value and the threshold value, the transmitting electronic device is configured to:
perform a remedial action based at least in part on one of: the measured received power, and a metric associated with the measured received power; and
transmit, to an output node of the interface circuit of the transmitting electronic device, a packet for the receiving electronic device in a manner consistent with the remedial action, wherein the remedial action comprises selectively transmitting, based at least in part on the received power, the packet for the receiving electronic device, and wherein the remedial action is other than a handover between transmitting electronic devices; and
when the measured received power is greater than the threshold value, the transmitting electronic device is configured to not transmit packets on the channel while maintaining a connection between the transmitting electronic device and the receiving electronic device.

2. The transmitting electronic device of claim 1, wherein the remedial action comprises selecting a modulation technique for the packet.

3. The transmitting electronic device of claim 2, wherein the modulation technique is further based at least in part on a channel correlation interval.

4. The transmitting electronic device of claim 1, wherein transmitting electronic device further comprises one or more antennas coupled to at least one of the input node and the output node, and the remedial action comprises selecting an antenna pattern for the one or more antennas; and
wherein the antenna pattern is used in at least one of: transmitting information to the output node for the receiving electronic device; and receiving information from the input node associated with the receiving electronic device.

5. The transmitting electronic device of claim 1, wherein the remedial action comprises reducing a transmit power used when transmitting the packet.

6. The transmitting electronic device of claim 1, wherein the remedial action comprises selecting a data rate for use when transmitting the packet.

7. The transmitting electronic device of claim 1, wherein the remedial action comprises:
determining a cumulative distribution function based at least in part on the measured received power; and
estimating a channel capacity based at least in part on the determined cumulative distribution function.

8. The transmitting electronic device of claim 7, wherein the remedial action further comprises setting a clear channel assessment based at least in part on the determined cumulative distribution function.

9. The transmitting electronic device of claim 1, wherein the measured received power is aggregated across the channel.

10. The transmitting electronic device of claim 1, wherein the measured received power is determined per subcarrier in the channel.

11. The transmitting electronic device of claim 1, wherein the remedial action is performed on a per-measurement basis for the measured received power.

12. The transmitting electronic device of claim 1, wherein the transmitting electronic device is configured to determine a cumulative distribution function based at least in part on the measured received power; and
wherein the metric corresponds to a noise floor in the cumulative distribution function.

13. The transmitting electronic device of claim 1, wherein the transmitting electronic device further comprises one or more antennas coupled to at least one of the input node and the output node.

14. The transmitting electronic device of claim 1, wherein the transmitting electronic device further comprises:
a processor; and
a memory, coupled to the processor, which is configured to store a program module, wherein, when executed by the processor, the program module causes the transmitting electronic device to perform one or more operations comprising: measuring the received power associated with the channel; comparing the measured received power to the threshold value and the second threshold value; performing the remedial action; and transmitting the packet to the output node.

15. A non-transitory computer-readable storage medium for use in conjunction with a transmitting electronic device, the computer-program product storing a program module to perform a remedial action, wherein, when executed by the transmitting electronic device, the program module causes the transmitting electronic device to perform one or more operations comprising:
measuring, at an input node of an interface circuit of the transmitting electronic device, received power associated with a channel during time intervals between received packets;
comparing the measured received power to a threshold value and a second threshold value, wherein the threshold value is always greater than the second threshold value;
when the measured received power is between the second threshold value and the threshold value, the one or more operations comprises:
performing a remedial action based at least in part on one of the measured received power and a metric associated with the measured received power; and
transmitting, to an output node of an interface circuit of the transmitting electronic device, a packet for a receiving electronic device in a manner consistent with the remedial action, wherein the remedial action comprises selectively transmitting, based at least in part on the received power, the packet for the receiving electronic device, and wherein the remedial action is other than a handover between transmitting electronic devices; and
when the measured received power is greater than the threshold value, the one or more operations comprise not allowing the transmitting electronic device to transmit packets on the channel while maintaining a connection between the transmitting electronic device and the receiving electronic device.

16. The computer-program product of claim 15, wherein the remedial action comprises one of: selecting a modulation technique for the packet; selecting an antenna pattern for one or more antennas that is used in one of transmitting information to the output node for the receiving electronic device and receiving information from the input node associated with the receiving electronic device; reducing a transmit power used when transmitting the packet; and selecting a data rate for use when transmitting the packet.

17. The computer-program product of claim 15, wherein the remedial action comprises:
determining a cumulative distribution function based at least in part on the measured received power; and
estimating a channel capacity based at least in part on the determined cumulative distribution function.

18. The computer-program product of claim 15, wherein the remedial action is performed on a per-measurement basis for the measured received power.

19. A method for performing a remedial action, wherein the method comprises:
by a transmitting electronic device:
measuring, from an input node of an interface circuit of the transmitting electronic device, received power associated with a channel during time intervals between received packets;
comparing the measured received power to a threshold value and a second threshold value, wherein the threshold value is always greater than the second threshold value;
when the measured received power is between the second threshold value and the threshold value, the method comprises:
performing a remedial action based at least in part on one of the measured received power and a metric associated with the measured received power; and
transmitting, to an output node of an interface circuit of the transmitting electronic device, a packet for a receiving electronic device in a manner consistent with the remedial action, wherein the remedial action comprises selectively transmitting, based at least in part on the received power, the packet for the receiving electronic device, and wherein the remedial action is other than a handover between transmitting electronic devices; and
when the measured received power is greater than the threshold value, the method comprises not allowing the transmitting electronic device to transmit packets on the channel while maintaining a connection between the transmitting electronic device and the receiving electronic device.

20. The method of claim 19, wherein the remedial action comprises selecting a modulation technique for the packet and the modulation technique is further based at least in part on a channel correlation interval.

* * * * *